United States Patent
Sato et al.

(10) Patent No.: US 10,202,086 B2
(45) Date of Patent: Feb. 12, 2019

(54) TAILGATE

(71) Applicant: HONDA MOTOR CO., LTD., Tokyo (JP)

(72) Inventors: Shun Sato, Wako (JP); Yosuke Kimura, Wako (JP); Nobuyuki Nishimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 156 days.

(21) Appl. No.: 15/276,298

(22) Filed: Sep. 26, 2016

(65) Prior Publication Data

US 2017/0089125 A1    Mar. 30, 2017

(30) Foreign Application Priority Data

Sep. 28, 2015 (JP) ................... 2015-190300

(51) Int. Cl.
| | |
|---|---|
| *B60R 13/04* | (2006.01) |
| *B60J 5/10* | (2006.01) |
| *E05F 15/70* | (2015.01) |
| *E05F 15/73* | (2015.01) |

(52) U.S. Cl.
CPC ............. *B60R 13/04* (2013.01); *B60J 5/101* (2013.01); *E05F 15/70* (2015.01); *E05F 15/73* (2015.01); *E05Y 2900/532* (2013.01)

(58) Field of Classification Search
CPC .............................. B60J 5/101; B60R 13/04
USPC .......................................................... 296/56
See application file for complete search history.

(56) References Cited

U.S. PATENT DOCUMENTS

| | | | | |
|---|---|---|---|---|
| 6,123,384 A | * | 9/2000 | Eustache | B60J 1/1884 15/250.3 |
| 6,834,906 B2 | * | 12/2004 | Vaitus | B60J 5/101 296/106 |
| 8,132,847 B2 | * | 3/2012 | Kimura | B60R 13/04 296/146.1 |
| 8,333,495 B2 | * | 12/2012 | Shamitz | B60Q 1/56 362/497 |
| 8,646,831 B2 | * | 2/2014 | Ohba | B60R 13/04 296/193.08 |
| 8,888,157 B2 | * | 11/2014 | Narahara | B62D 25/2027 296/1.08 |

FOREIGN PATENT DOCUMENTS

| | | |
|---|---|---|
| JP | 2006-282035 A | 10/2006 |
| JP | 2010-105425 A | 5/2010 |
| JP | 5310435 B2 | 10/2013 |
| JP | 2014-172572 A | 9/2014 |

OTHER PUBLICATIONS

Japanese Office Action dated Sep. 4, 2017, issued in corresponding Japanese Application No. 2015-190300 and partial English translation of the same. (7 pages).

* cited by examiner

*Primary Examiner* — Catherine A Kelly
(74) *Attorney, Agent, or Firm* — Thomas | Horstemeyer, LLP

(57) ABSTRACT

A tailgate for opening/closing an opening of a vehicle includes an outer panel configured to form an outer surface of the tailgate, a garnish mounted on the outer panel and configured to form the outer surface of the tailgate, and a switch unit including at least a switch configured to instruct an opening operation of the tailgate. The switch unit is arranged in a space between the outer panel and the garnish, and mounted on the outer panel and the garnish.

9 Claims, 9 Drawing Sheets

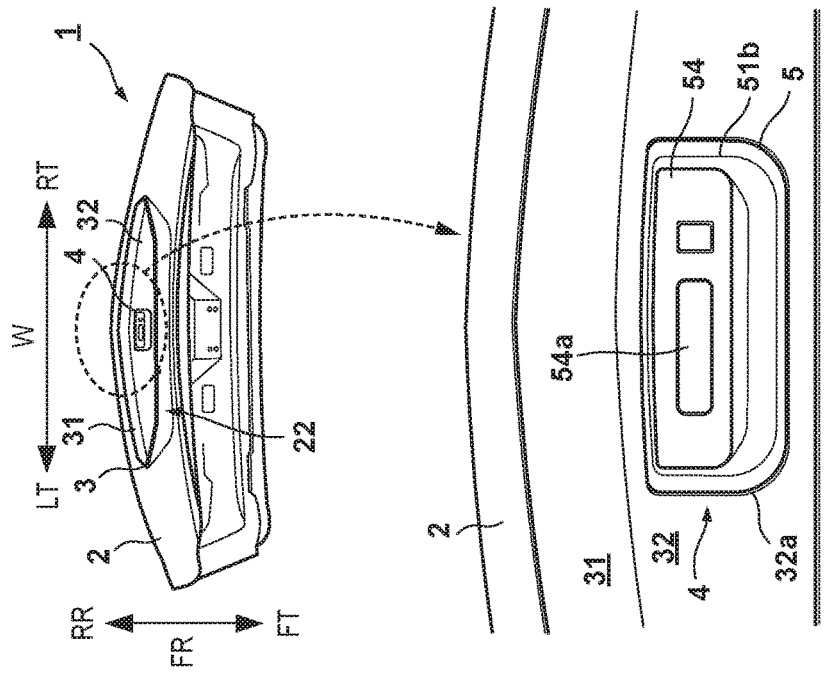
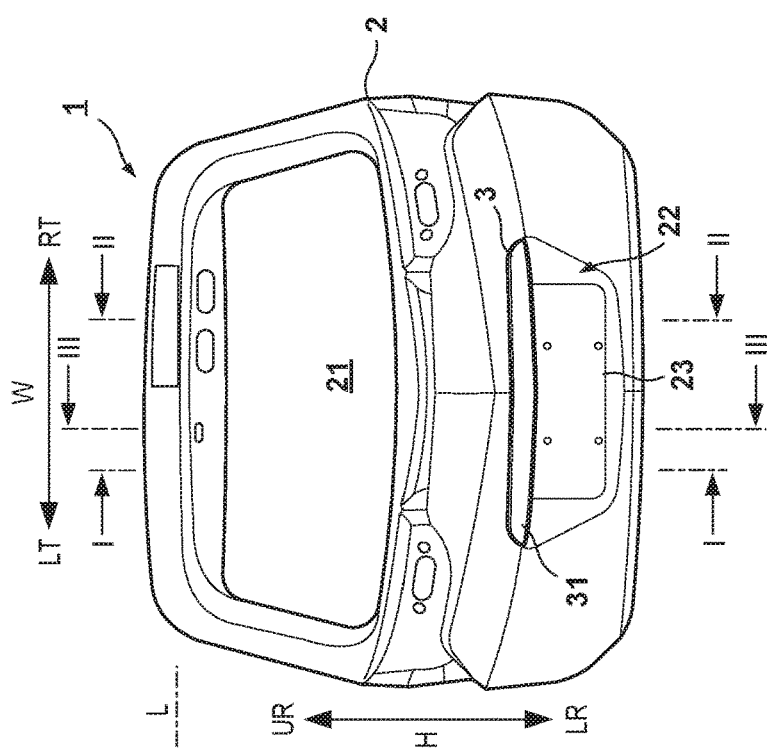

TAILGATE

CROSS-REFERENCE TO RELATED APPLICATION

This application is based upon and claims the benefit of priority from the prior Japanese Patent Application No. 2015-190300, filed on Sep. 28, 2015, the entire contents of which are incorporated herein by reference.

BACKGROUND OF THE INVENTION

Field of the Invention

The present invention relates to the tailgate of a vehicle.

Description of the Related Art

A tailgate including a switch with which a passenger instructs the opening operation of the tailgate is known as a tailgate for opening/closing an opening on the rear part of a vehicle. Japanese Patent No. 5310435 discloses a structure in which such switch is mounted on the outer panel of a tailgate, and covered with a garnish.

Since the switch of the tailgate is to be operated by a passenger, an operation load may be applied by the passenger to the switch and the garnish around it, and some passengers may apply an operation load more than necessary. A portion of the tailgate around the switch is externally exposed, and may be applied with some external force. Therefore, the switch and the portion around it are desirably, sufficiently resistant to an operation load or external force, and the conventional structure has room for improvement in this point.

SUMMARY OF THE INVENTION

The present invention enables improvement of the rigidity of a tailgate around a switch.

According to an aspect of the present invention, there is provided a tailgate for opening/closing an opening of a vehicle, comprising: an outer panel configured to form an outer surface of the tailgate; a garnish mounted on the outer panel and configured to form the outer surface of the tailgate; and a switch unit including at least a switch configured to instruct an opening operation of the tailgate, wherein the switch unit is arranged in a space between the outer panel and the garnish, and mounted on the outer panel and the garnish.

Further features of the present invention will become apparent from the following description of exemplary embodiments (with reference to the attached drawings).

BRIEF DESCRIPTION OF THE DRAWINGS

FIG. 1A is a front view showing a tailgate according to an embodiment;

FIG. 1B is a bottom view showing the tailgate;

FIG. 1C is a partially enlarged view showing the tailgate;

DESCRIPTION OF THE EMBODIMENTS

Figure 2A:
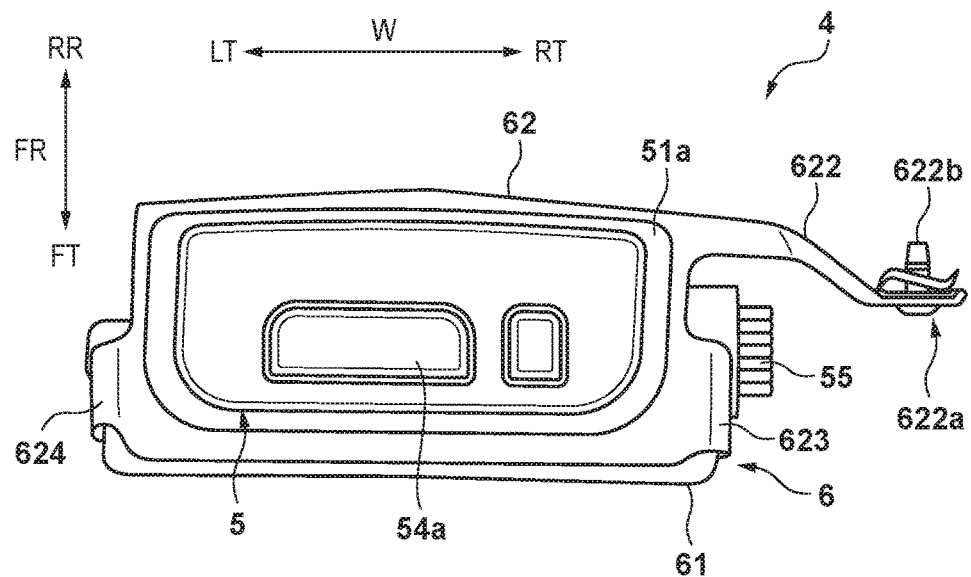
FIGS. 2A and 2B are views each showing the outer appearance of a switch unit.
Figure 2B:
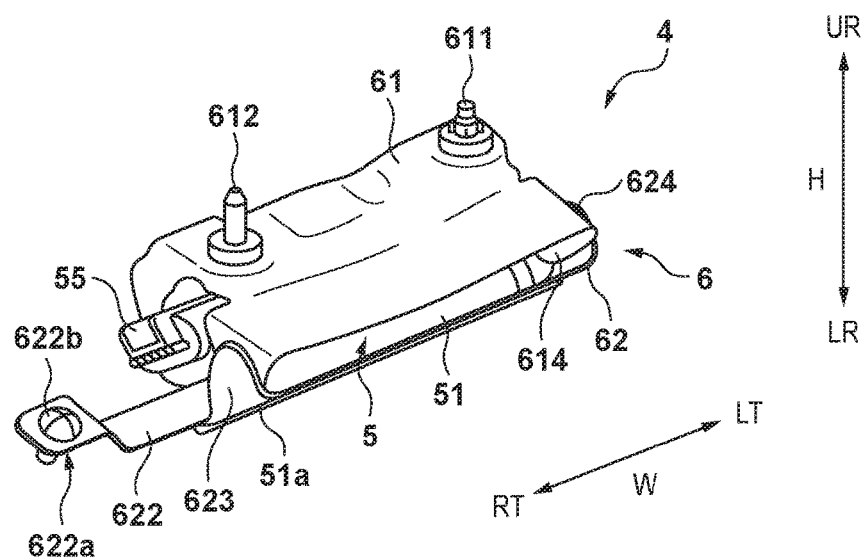
Figure 3A:
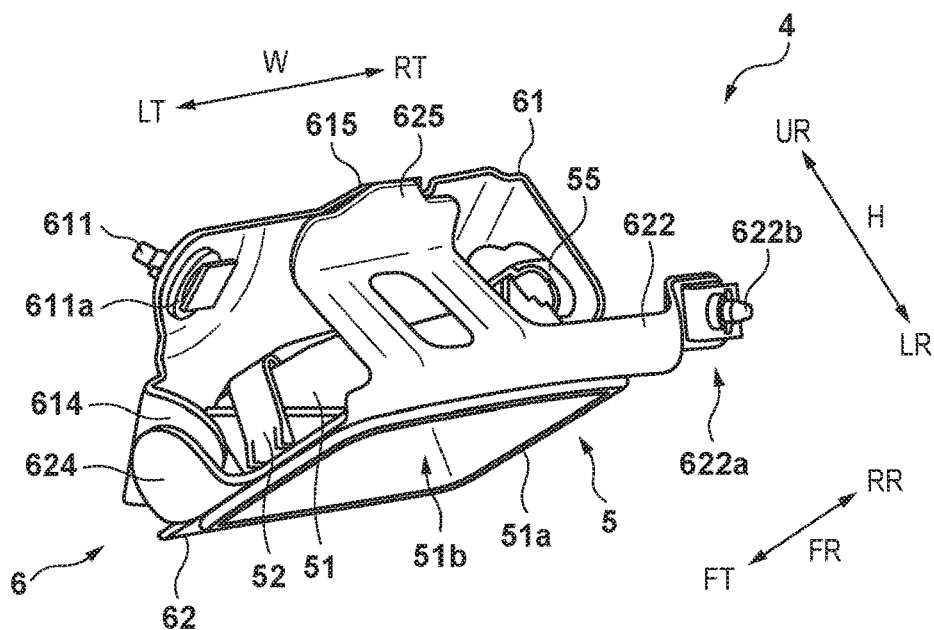
FIGS. 3A and 3B are views each showing the outer appearance of the switch unit.
Figure 3B:
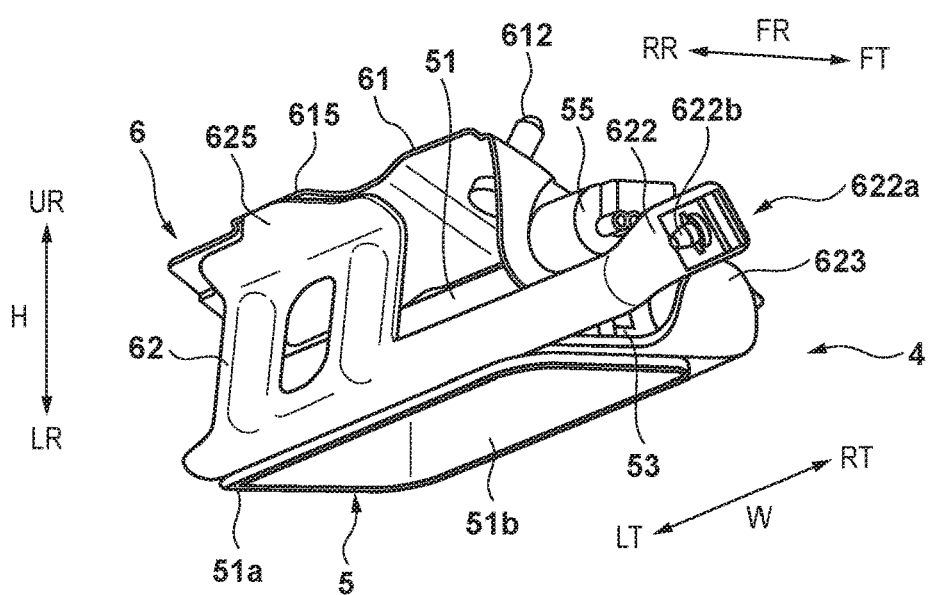
Figure 4A:
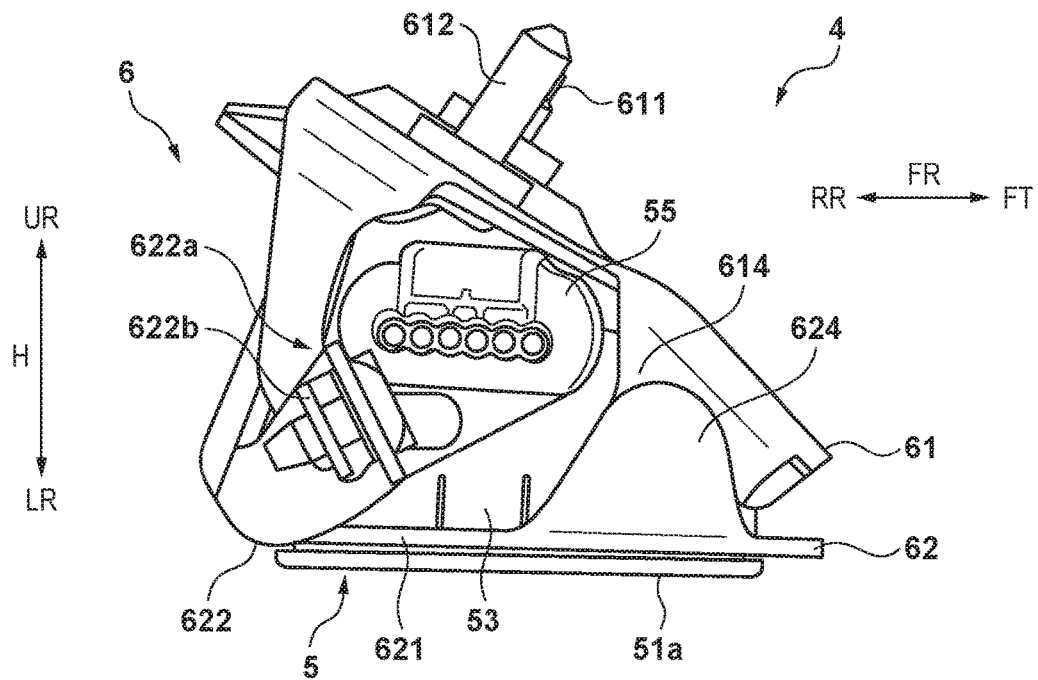
FIGS. 4A and 4B are views each showing the outer appearance of the switch unit.
Figure 4B:
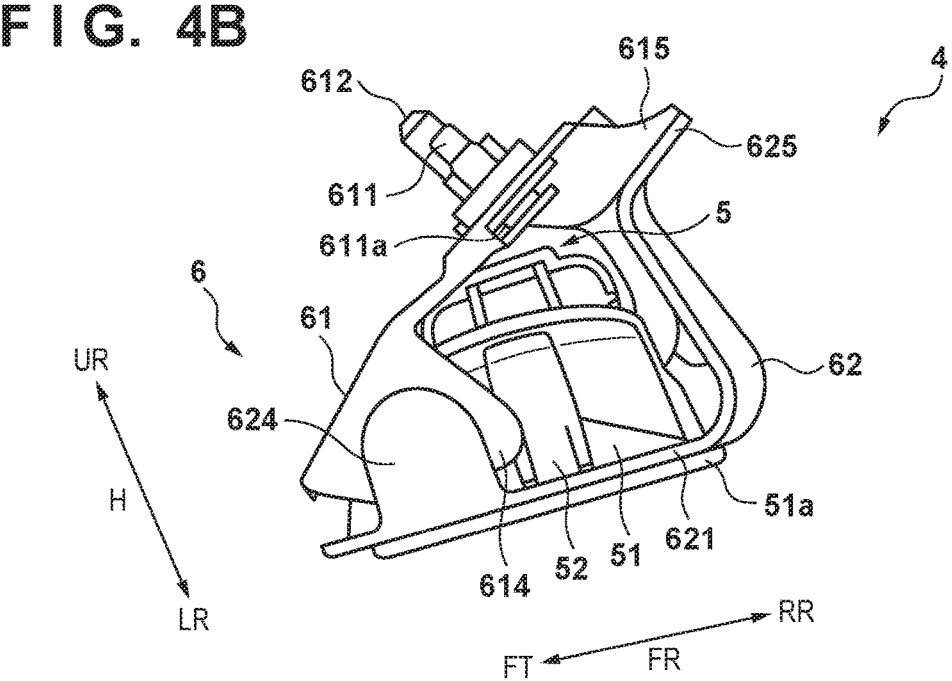

A tailgate according to an embodiment of the present invention will be described below. Throughout the drawings, an arrow FR indicates the front-and-rear direction of a vehicle and FT and RR respectively indicate front and rear sides. An arrow W indicates a vehicle width direction and LT and RT respectively indicate left and right sides when viewed from the advancing direction of the vehicle. An arrow H indicates a vertical direction and UR and LR respectively indicate upper and lower sides.

<Overall Structure>

FIG. 1A is a front view showing a tailgate 1 (semi-assembled state) according to an embodiment of the present invention, and corresponds to a rear view of a vehicle when the tailgate is assembled in the vehicle. FIG. 1B is a bottom view showing the tailgate 1, and FIG. 1C is a partially enlarged view of FIG. 1B.

The tailgate 1 is a door for opening/closing an opening on the rear part of the vehicle. For example, the tailgate 1 is assembled in the vehicle to pivot about a line L in FIG. 1A in the vertical direction. The tailgate 1 is applicable to various automobiles, for example, a minivan, SUV, and station wagon.

The tailgate 1 includes an outer panel 2 and a garnish 3. The outer panel 2 is a member forming most of the outer surface of the tailgate 1. The outer panel 2 includes an opening 21 to which a rear windshield is attached, and a concave portion 23 forming a mounting portion for a license plate. The garnish 3 is a decoration body which extends in the vehicle width direction along the upper edge of the concave portion 23. The garnish 3 is mounted on the outer panel 2, and forms part of the outer surface of the tailgate 1. A switch unit 4 is disposed in the garnish 3.

The switch unit 4 is a unit which includes an operation portion 54 facing downward, and includes, in the operation portion 54, an open switch 54a for instructing the open operation of the tailgate 1. When a passenger operates the open switch 54a, the tailgate 1 automatically pivots to open the opening on the rear part of the vehicle. In addition to the open switch 54a, a switch (for example, a smart switch) to be operated by a passenger, a light emitting device (for example, an LED) for illuminating a license plate, and the like can be provided in the operation portion 54.

<Switch Unit>

Figure 5A:
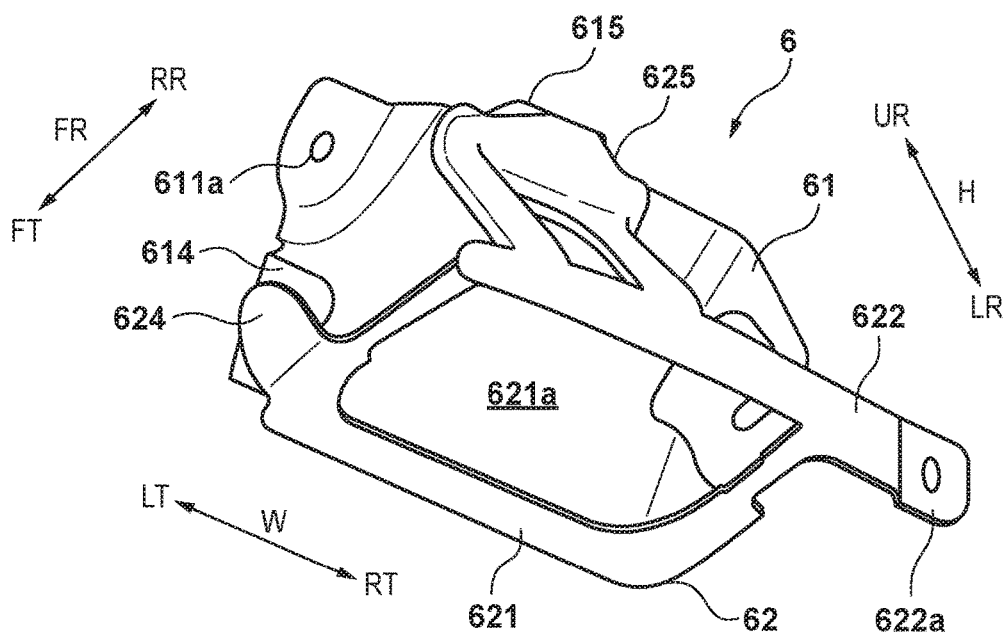
FIGS. 5A and 5B are views each showing the outer appearance of a bracket.
Figure 5B:
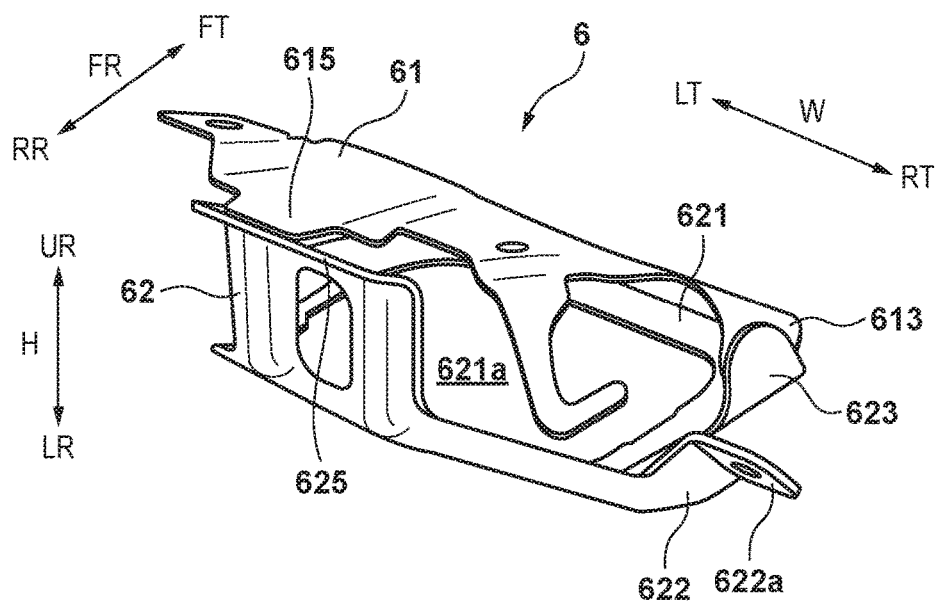

The arrangement of the switch unit 4 will be described with reference to FIGS. 2A to 5B. FIGS. 2A to 4B are views each showing the outer appearance of the switch unit 4. FIGS. 5A and 5B are views each showing the outer appearance of a bracket 6 included in the switch unit 4 when a main body portion 5 is detached from the switch unit 4. The arrows FR, W, and H in FIGS. 2A to 5B are based on a case in which the switch unit 4 is mounted on the vehicle and the tailgate 1 is in a closed state.

The switch unit 4 includes the main body portion 5 and the bracket 6. The main body portion 5 is a portion including an electric circuit with the open switch 54a. The bracket 6 is a portion mounted on the outer panel 2 and the garnish 3.

The main body portion 5 includes a case 51 which accommodates the electric circuit with the open switch 54a.

The case 51 is a hollow body including a concave portion 51b open to the lower side, and the operation portion 54 is located on the far side of the concave portion 51b. A flange portion 51a projecting outward is formed at the lower end of the concave portion 51b to rim the opening of the concave portion 51b.

An engaging piece 52 is formed in a portion on one side of the case 51 in the vehicle width direction. The engaging piece 52 has an upper end integrally connected to the side wall of the case 51, and a pawl portion at a lower end, and is elastically deformable in the vehicle width direction around the upper end.

In a lower portion on the other side of the case 51 in the vehicle width direction, an engaging pawl 53 is integrally formed. The main body portion 5 is mounted on the bracket 6 by sandwiching a frame portion 621 of the bracket 6 between the pawl portion of the engaging piece 52 and the flange portion 51a while sandwiching the frame portion 621 of the bracket 6 between the engaging pawl 53 and the flange portion 51a. The main body portion 5 is detachably attached to the bracket 6 by elastic deformation of the engaging piece 52.

A coupler 55 is provided in the portion on the other side of the case 51 in the vehicle width direction. An electric wire (harness) for electrically connecting the control unit of the vehicle and the electric circuit of the main body portion 5 is connected to the coupler 55. Connection of the electric wire allows power supply of the electric circuit including the open switch 54a and transmission of a signal to the control unit. In this embodiment, the insertion/extraction direction of the electric wire for the coupler 55 is the vehicle width direction.

The bracket 6 is formed to surround the main body portion 5. This can protect the main body portion 5 from an external force with the bracket 6. In this embodiment, the bracket 6 is constituted by two members, and includes an upper frame body 61 and a lower frame body 62. Although the bracket 6 can be constituted by one member, it is possible to relatively easily create an arrangement to surround the main body portion 5 by constituting the bracket 6 by two members.

The upper frame body 61 is a frame body constituting the upper side of the bracket 6, which extends in the vehicle width direction and has a shape in which the two ends in the vehicle width direction are bent downward. Portions 613 and 614 bent downward are fixed to the lower frame body 62 by welding or the like. A central portion 615 is also fixed to the lower frame body 62 by welding or the like.

A mounting member 611 and a positioning member 612 are provided in the upper frame body 61 to project upward. The mounting member 611 is a member for mounting the garnish 3 and the switch unit 4 on the outer panel 2 at one position. The upper portion of the mounting member 611 is engaged with the outer panel 2 and an engaging portion 611a of the lower portion of the mounting member 611 is engaged with the garnish 3. The positioning member 612 is a positioning pin inserted into a positioning hole formed in the outer panel 2.

The lower frame body 62 is a frame body constituting the lower side of the bracket 6, and includes the frame portion 621 forming an opening 621a to expose the operation portion 54 of the main body portion 5. The frame portion 621 is formed to overlap the flange portion 51a, and can protect a portion around the operation portion 54 by the frame portion 621. Portions 623 and 624 bent upward are formed at the two ends of the frame portion 621 in the vehicle width direction. These portions 623 and 624 are respectively fixed to the portions 613 and 614 of the upper frame body 61 by welding or the like. A portion 625 bent upward is formed in the central portion of the frame portion 621 in the vehicle width direction on the rear part in the vehicle width direction. The portion 625 is fixed to the portion 615 of the upper frame body 61 by welding or the like.

The lower frame body 62 includes an extension portion 622 extending from the frame portion 621 in the vehicle width direction. A mounting portion 622a is formed at the end of the extension portion 622, and mounted on the garnish 3 by a mounting member 622b. When the extension portion 622 extends from the frame portion 621 in the vehicle width direction, a larger size of the opening 621a in the front-and-rear direction of the vehicle can be ensured, thereby improving the operability or the degree of freedom of the shape of the operation portion 54.

<Mounting Structure>

Figure 6:
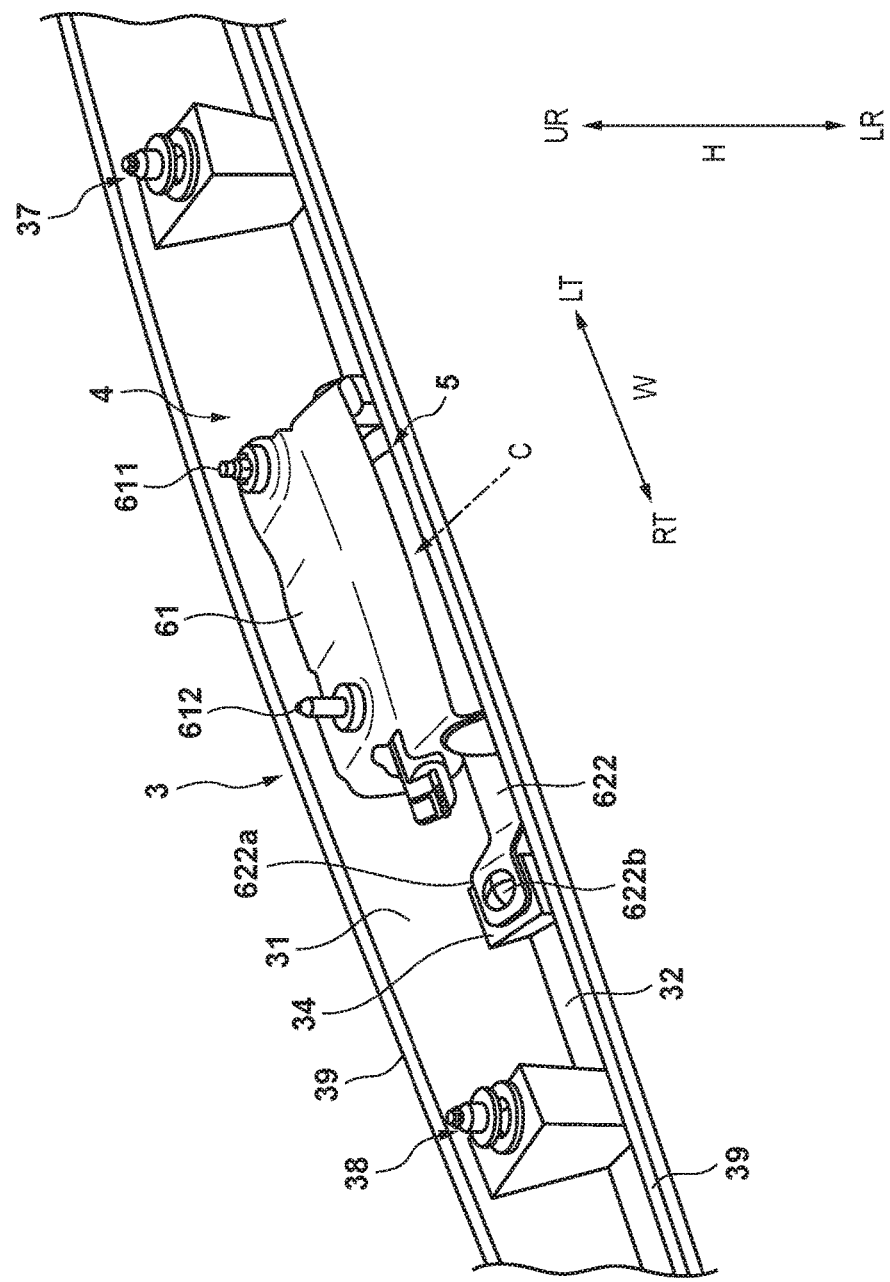
FIG. 6 is a view showing a state in which the switch unit is mounted on a garnish.
Figure 7:
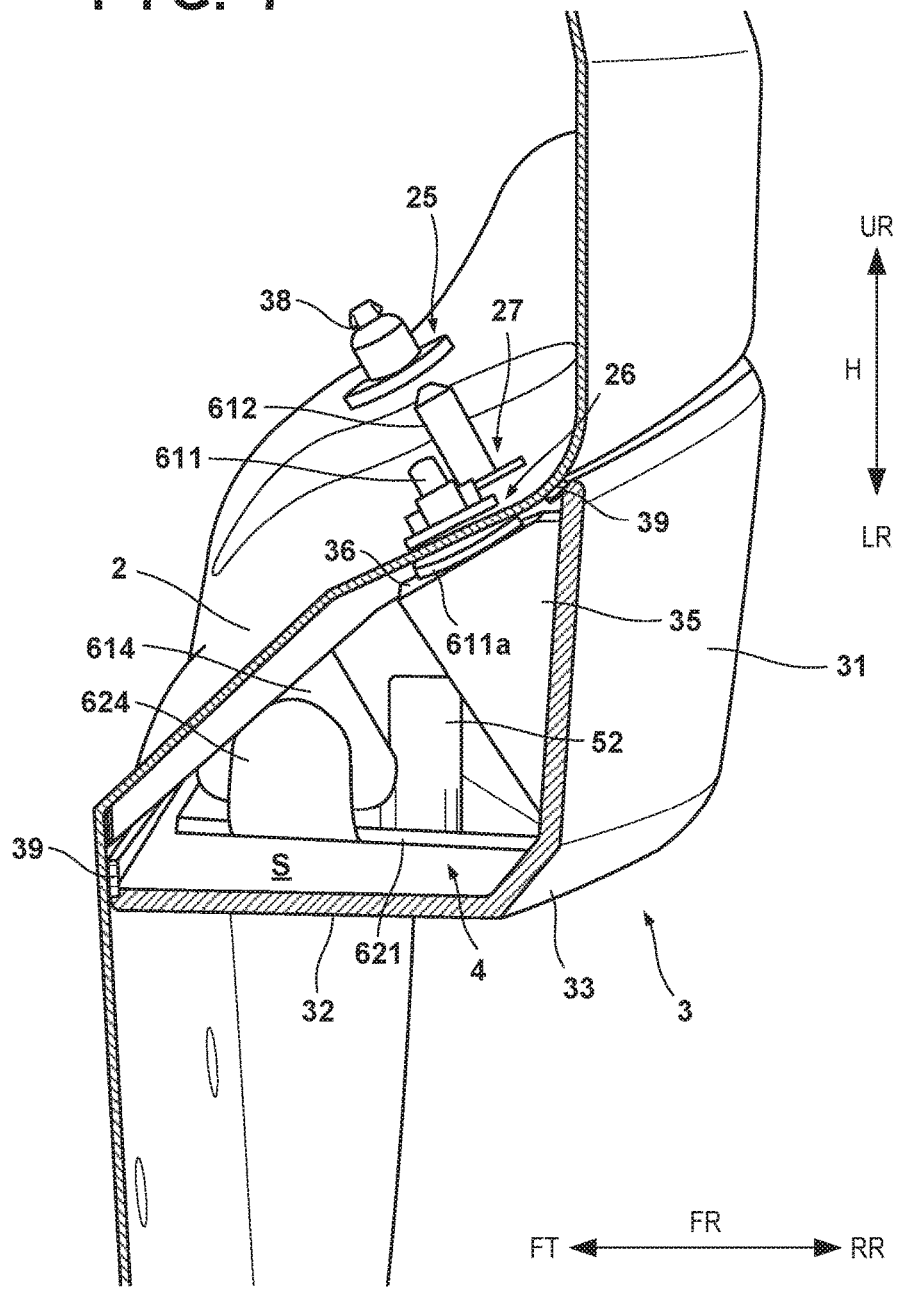
FIG. 7 is a sectional view taken along a line I-I in FIG. 1A and showing a portion around the garnish.
Figure 8:
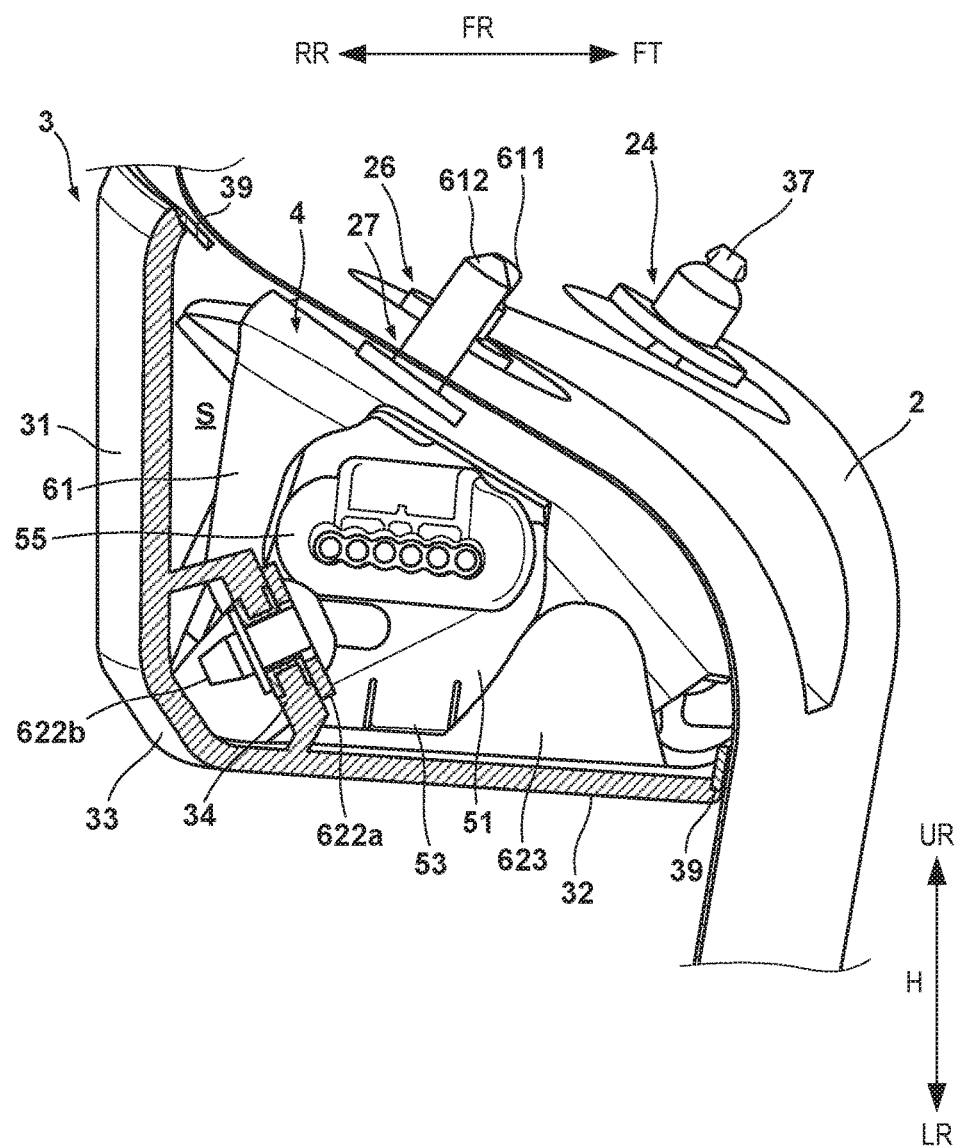
FIG. 8 is a sectional view taken along a line II-II in FIG. 1A and showing the portion around the garnish.
Figure 9:
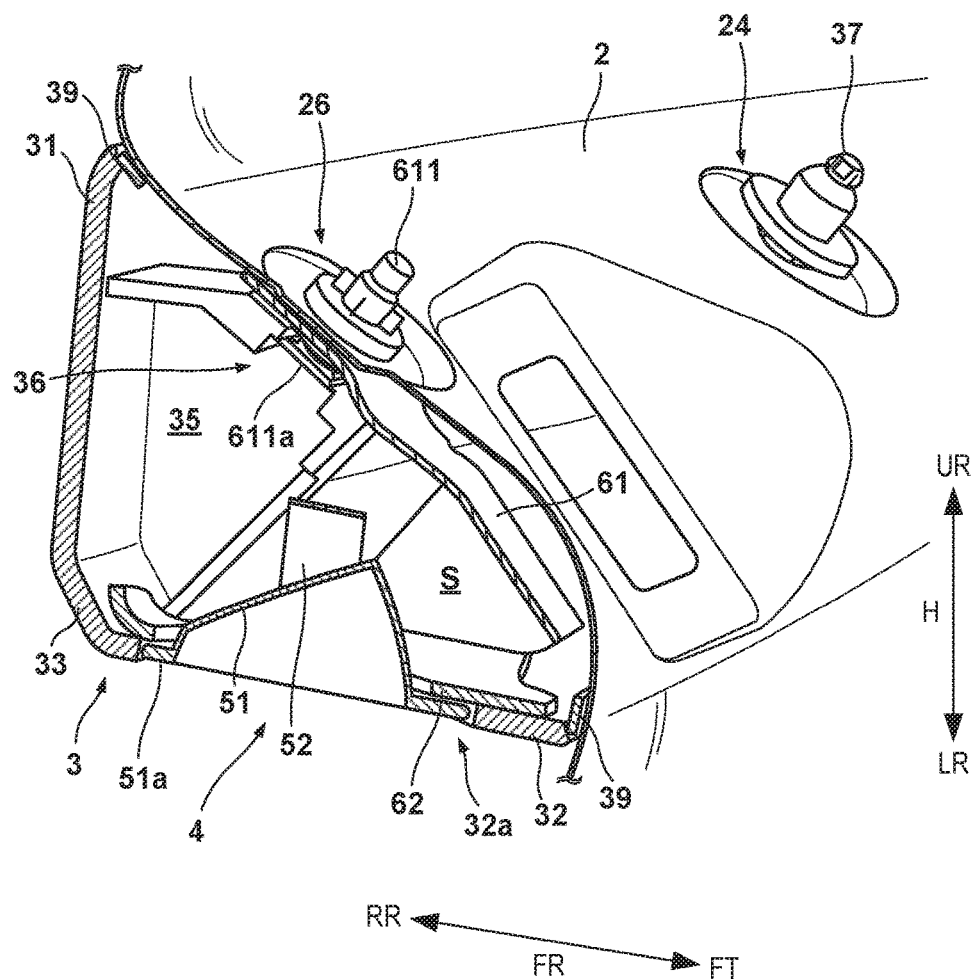
FIG. 9 is a sectional view taken along a line III-III in FIG. 1A and showing the portion around the garnish.

The garnish 3 and the overall mounting structure will be described with reference to FIGS. 6 to 9. FIG. 6 is a view showing a state in which the switch unit 4 is mounted on the garnish 3, and shows the interior of the garnish 3. FIG. 7 is a sectional view taken along a line I-I in FIG. 1A and showing a portion around the garnish 3. FIG. 8 is a sectional view taken along a line II-II in FIG. 1A and showing the portion around the garnish 3. FIG. 9 is a sectional view taken along a line III-III in FIG. 1A and showing the portion around the garnish 3.

The garnish 3 includes a wall portion 31 and a wall portion 32 continuing from the wall portion 31 through a corner 33, and has an L-shaped vertical sectional shape. When the garnish 3 includes the corner portion 33, the rigidity can be improved by the shape. The wall portion 31 is formed along the surface of the outer panel 2, and the surface of the wall portion 31 almost continues from the surface of the outer panel 2. The wall portion 32 continues from the wall portion 31 to have an angle (about 90° in this example) with respect to the wall portion 31, and extends almost in the horizontal direction in this embodiment. Seal members 39 extend at the edges of the wall portions 31 and 32.

Mounting members 37 and 38 are spaced apart from each other in the vehicle width direction, and fixed inside the garnish 3. The mounting members 37 and 38 are members used to fix the garnish 3 and outer panel 2, and are respectively mounted on mounting portions 24 and 25 provided in the outer panel 2. The mounting portions 24 and 25 respectively have holes into which the mounting members 37 and 38 are inserted. By pressing the garnish 3 to the side of the outer panel 2 while aligning the mounting members 37 and 38 and the corresponding holes, the mounting portions 24 and 25 are respectively engaged with the mounting members 37 and 38, and thus the garnish 3 is fixed to the outer panel 2.

The switch unit 4 is arranged in a space S between the outer panel 2 and the garnish 3 (a space surrounded by the outer panel 2 and the garnish 3). A mounting portion 34 is provided inside the corner portion 33 of the garnish 3. The mounting portion 34 has a hole into which the mounting member 622b is inserted. When the mounting member 622b is inserted into the hole, the mounting portion 34 and the mounting member 622b are engaged, and thus the mounting portion 622a of the extension portion 622 is fixed to the mounting portion 34. The mounting portion 34 is formed in the corner portion 33 to bridge the wall portions 31 and 32. Since the mounting portion 34 is provided in the corner portion 33 where the rigidity is increased, the mounting rigidity of the switch unit 4 can be improved.

A rib 35 is integrally formed in the garnish 3. The mounting portion 36 engaged with the engaging portion 611a of the mounting member 611 is provided in the rib 35. A mounting portion 36 is a groove open to the right side in the vehicle width direction (see FIG. 9), and is configured so that the engaging portion 611a and the mounting portion 36 are engaged with each other by moving the engaging portion 611a from the right side to the left side in the vehicle width direction to fit in the mounting portion 36. The mounting member 611 is mounted on a mounting portion 26 provided in the outer panel 2. The mounting portion 26 has a hole into which the upper portion of the mounting member 611 is inserted. When the upper portion of the mounting member 611 is inserted into the hole, the mounting portion 26 and the mounting member 611 are engaged. The mounting member 611 fixes the outer panel 2, the garnish 3, and the switch unit 4 at one position.

To assemble the garnish 3 and the switch unit 4 in the outer panel 2, the switch unit 4 is assembled in the garnish 3 first, as shown in FIG. 6. As a procedure, the engaging portion 611a is engaged with the mounting portion 36, and then the mounting portion 622a is mounted on the mounting portion 34 by the mounting member 622b.

In this embodiment, the switch unit 4 has two mounting portions (the engaging portion 611a of the mounting member 611 and the mounting portion 622a) for the garnish 3. The two mounting portions can be spaced apart from each other by providing the mounting portion 622a at the end of the extension portion 622. This stabilizes fixing of the switch unit 4 to the garnish 3.

Since the main body portion 5 and the mounting portion 622a are arranged in the vehicle width direction, it is possible to ensure a wider space in the front-and-rear direction of the vehicle or the vertical direction as the arrangement space of the main body portion 5. Therefore, with respect to the shape of the main body portion 5, the degree of freedom in the front-and-rear direction of the vehicle or the vertical direction can be improved. Alternatively, it is also possible to ensure, for the main body portion 5, a wider gap i the front-and-rear direction of the vehicle or the vertical direction, and to delay the interference of the main body portion 5 with its surrounding portion at the time of input of an external force, thereby facilitating prevention of damage.

The coupler 55 is located on the side of the extension portion 622 in the vehicle width direction with respect to a central portion C (FIG. 6) of the main body portion 5 in the vehicle width direction. Since the coupler 55 is located adjacent to the extension portion 622 whose rigidity becomes relatively high by mounting on the mounting portion 622a, it is possible to reduce the possibility that the coupler 55 is damaged upon input of an external force. Note that the arrangement space of the connector of the electric wire connected to the coupler 55 is ensured by providing the mounting portion 622a at the end of the extension portion 622.

The garnish 3 in which the switch unit 4 has been assembled is pressed into the outer panel 2, and is thus fixed to the outer panel 2. At this time, the positioning member 612 of the switch unit 4 is inserted into a positioning hole 27 of the outer panel 2, which is used as a guide to press the garnish 3 into the outer panel 2, thereby facilitating alignment between the respective portions. When the garnish 3 is pressed into the outer panel 2, the mounting portions 24 and 25 and the mounting members 37 and 38 are respectively engaged to mount the garnish 3 on the outer panel 2, and the mounting portion 26 and the mounting member 611 are engaged to fix the outer panel 2, the garnish 3, and the switch unit 4 at one position.

In this embodiment, the switch unit 4 is mounted on both the outer panel 2 and the garnish 3. The switch unit 4 (especially, the bracket 6) functions as a reinforcing member for connecting the outer panel 2 and the garnish 3 in the space S between them. Therefore, the mounting rigidity of the switch unit 4 is improved, and the support rigidity of the garnish 3 is improved by supporting the garnish 3 by the switch unit 4. Consequently, it is possible to improve the rigidity of the tailgate 1 around the open switch 54a.

Since the outer panel 2, the garnish 3, and the switch unit 4 are fixed at one position by the mounting member 611 in the mounting portion 26, the number of mounting portions can be decreased to reduce the number of parts and the number of processes, as compared with an arrangement in which a plurality of mounting portions each for fixing two of the three members are provided. Since the mounting member 611 co-fastens the plurality of members, the rigidity of the mounting portion can be improved.

Although a plurality of portions for fixing three members like the mounting portion 26 can be provided, only one such portion is provided in this embodiment. The outer panel 2, the garnish 3, and the switch unit 4 may have different properties such as heat deformation amounts. If a plurality of portions for fixing three members are provided, it is necessary to perform design in consideration of the distortion amount of each member and the like. By providing only one such portion as in this embodiment, such consideration becomes unnecessary and a relatively simple structure can be obtained.

Summary of Embodiment

1. According to the embodiment, there is provided a tailgate (for example, 1) for opening/closing an opening of a vehicle, comprising:

an outer panel (for example, 2) configured to form an outer surface of the tailgate;

a garnish (for example, 3) mounted on the outer panel and configured to form the outer surface of the tailgate; and a switch unit (for example, 4) including at least a switch (for example, 54a) configured to instruct an opening operation of the tailgate, wherein the switch unit is arranged in a space (for example, S) between the outer panel and the garnish, and mounted on the outer panel and the garnish (for example, 26, 34).

According to this arrangement, since the switch unit is mounted on both the outer panel and the garnish, the mounting rigidity of the switch unit is improved, and the support rigidity of the garnish is improved by supporting the garnish by the switch unit. Consequently, it is possible to improve the rigidity of the tailgate around the switch.

2. According to the embodiment, there is provided the tailgate (for example, 1), wherein the garnish includes a first wall portion (for example, 31) along a surface of the outer panel, and a second wall portion (for example, 32) continuing from the first wall portion through a corner portion (for example, 33), and the switch unit is mounted on the garnish in a mounting portion (for example, 34) provided in the corner portion.

According to this arrangement, when the garnish includes the corner portion, the rigidity of the garnish can be improved by the shape. In addition, since the mounting portion of the switch unit is provided in the corner portion, the mounting rigidity of the switch unit is also improved.

3. According to the embodiment, there is provided the tailgate (for example, 1), wherein the switch unit includes a main body portion (for example, 5) in which the switch is provided, and an extension portion (for example, 622) extending from the main body portion in a vehicle width direction, and the extension portion is mounted on the mounting portion.

According to this arrangement, since the main body portion and the mounting portion are arranged in the vehicle width direction, it is possible to ensure a wider space in the front-and-rear direction of the vehicle or the vertical direction as the arrangement space of the main body portion. Therefore, with respect to the shape of the main body portion, the degree of freedom in the front-and-rear direction of the vehicle or the vertical direction can be improved. Alternatively, it is possible to ensure, for the main body portion, a wider gap in the front-and-rear direction of the vehicle or the vertical direction, and to delay the interference of the main body portion with its surrounding portion at the time of input of an external force, thereby facilitating prevention of damage.

4. According to the embodiment, there is provided the tailgate (for example, 1), wherein the main body portion includes a coupler (for example, 55) to which an electric wire is connected, and the coupler is located on a side of the extension portion in the vehicle width direction with respect to a central portion (for example, C) of the main body portion in the vehicle width direction.

According to this arrangement, since the coupler is located adjacent to the extension portion whose rigidity becomes relatively high by mounting on the mounting portion, it is possible to reduce the possibility that the coupler is damaged upon input of an external force.

5. According to the embodiment, there is provided the tailgate (for example, 1), further comprising:

a mounting member (for example, 612) configured to mount the garnish and the switch unit on the outer panel at one position.

According to this arrangement, the number of mounting portions can be decreased to reduce the number of parts and the number of processes. Furthermore, since the mounting member fixes the plurality of members, the rigidity of the mounting portion can be improved.

6. According to the embodiment, there is provided the tailgate (for example, 1), wherein there exists only one mounting portion (for example, 26) by the mounting member.

According to this arrangement, it is unnecessary to consider the differences in heat deformation amount and the like between a plurality of members, and a relatively simple structure can be obtained.

7. According to the embodiment, there is provided the tailgate (for example, 1), wherein the switch unit includes a main body portion (for example, 5) in which the switch is provided, and a bracket (for example, 6) configured to support the main body portion to surround the main body portion, and the bracket is mounted on the outer panel and the garnish.

According to this arrangement, the main body portion can be protected by the bracket.

8. According to the embodiment, there is provided the tailgate (for example, 1), wherein the bracket includes a first member (for example, 61) including a first mounting portion (for example, 611) mounted on the outer panel, and a second member (for example, 62) including a second mounting portion (for example, 622a, 622b) mounted on the garnish, and the first member and the second member are fixed.

According to this arrangement, it is possible to relatively easily create a structure to surround the main body portion.

9. According to the embodiment, there is provided the tailgate (for example, 1), wherein the second member includes a frame portion (for example, 621) configured to form an opening (for example, 621a) to expose an operation portion of the main body portion, and an extension portion (for example, 622) extending from the frame portion in the vehicle width direction and including the second mounting portion.

According to this arrangement, by protecting a portion around the operation portion by the frame portion and providing the extension portion extending from the frame portion in the vehicle width direction, it is possible to ensure a larger size of the opening in the front-and-rear direction of the vehicle, thereby improving the operability or the degree of freedom of the shape of the operation portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2015-190300, filed Sep. 28, 2015, which is hereby incorporated by reference herein in its entirety.

What is claimed is:

1. A tailgate for opening and closing an opening of a vehicle, comprising:

an outer panel configured to form an outer surface of the tailgate;

a garnish mounted on the outer panel and configured to form the outer surface of the tailgate; and a switch unit including at least a switch configured to instruct an opening operation of the tailgate, wherein the switch unit is arranged in a space between the outer panel and the garnish, and mounted on the outer panel and the garnish, the garnish includes a first wall portion coextending with a surface of the outer panel, and a second wall portion continuing from the first wall portion through a corner portion, and the switch unit is mounted on a bridge portion of the garnish, the bridge portion being formed in the corner portion to bridge the first wall portion and the second wall portion.

2. The tailgate according to claim 1, wherein the switch unit includes a main body portion in which the switch is provided, and an extension portion extending from the main body portion in a vehicle width direction, and the extension portion is mounted on the bridge portion.

3. The tailgate according to claim 2, wherein the main body portion has one end and an other end in the vehicle width direction, the extension portion extends from the one end, the main body portion includes a coupler to which an electric wire is connected, and the coupler is located on a side of the one end in the vehicle width direction.

4. The tailgate according to claim 1, wherein the switch unit includes:

a first mounting portion mounted on the outer panel, and a second mounting portion mounted on the bridge portion of the garnish, and the switch unit comprises a mounting member as the first mounting portion configured to mount the garnish and the switch unit on the outer panel at one position.

5. The tailgate according to claim 4, wherein the first mounting portion is only one mounting portion where both the switch unit and the garnish are fastened with the outer panel.

6. The tailgate according to claim 1, wherein
the switch unit includes a main body and a bracket,
the main body includes:
   a case having a concave portion open to a lower side of the case, and
   the switch located on a far side of the concave portion,
the bracket is formed so as to surround the main body portion, and
the bracket includes:
   a first mounting portion mounted on the outer panel, and
   a second mounting portion mounted on the bridge portion of the garnish.

7. The tailgate according to claim 6, wherein the bracket comprises:

an upper frame body configured to form an upper side of the bracket, and a lower frame body configured to form a lower side of the bracket, the first mounting portion is provided in the upper frame body, and the second mounting portion is provided in the lower frame body.

8. The tailgate according to claim 6, wherein
the garnish includes engaging members for mounting the garnish on the outer panel,
the engaging members are configured to be inserted to holes provided in the outer panel, and
each respective engaging member is located apart from the switch unit in a vehicle width direction.

9. The tailgate according to claim 1, wherein
the switch unit includes a main body and a bracket,
the main body includes a coupler to which an electric wire is connected,
the coupler is located on one end of the main body in a vehicle width direction, and
the bracket includes:
   a first mounting portion mounted on the outer panel, and
   a second mounting portion mounted on the bridge portion of the garnish.

\* \* \* \* \*